United States Patent
Jensen

(10) Patent No.: US 11,757,323 B2
(45) Date of Patent: Sep. 12, 2023

(54) AXIAL FLUX PERMANENT MAGNET MOTOR/GENERATOR

(71) Applicant: Elijah Robert Jensen, Louisville, KY (US)

(72) Inventor: Elijah Robert Jensen, Louisville, KY (US)

(73) Assignee: Blackbox Energy Systems, LLC, Louisville, KY (US)

( * ) Notice: Subject to any disclaimer, the term of this patent is extended or adjusted under 35 U.S.C. 154(b) by 185 days.

(21) Appl. No.: 17/204,510

(22) Filed: Mar. 17, 2021

(65) Prior Publication Data

US 2022/0302789 A1    Sep. 22, 2022

(51) Int. Cl.
| | |
|---|---|
| *H02K 16/00* | (2006.01) |
| *H02K 3/48* | (2006.01) |
| *H02K 7/00* | (2006.01) |
| *H02K 5/04* | (2006.01) |
| *H02K 1/16* | (2006.01) |

(52) U.S. Cl.
CPC ............... *H02K 3/48* (2013.01); *H02K 1/16* (2013.01); *H02K 5/04* (2013.01); *H02K 7/003* (2013.01)

(58) Field of Classification Search
CPC .. H02K 1/16; H02K 3/47; H02K 3/48; H02K 5/04; H02K 7/003; H02K 16/00; H02K 21/24
See application file for complete search history.

(56) References Cited

U.S. PATENT DOCUMENTS

| | | | | |
|---|---|---|---|---|
| 4,658,162 A * | 4/1987 | Koyama | ................ | H02K 29/08 318/135 |
| 6,040,650 A * | 3/2000 | Rao | ......................... | H02K 3/00 310/268 |
| 7,291,956 B2 * | 11/2007 | Itoh | ........................ | H02K 3/26 310/71 |
| 8,736,133 B1 * | 5/2014 | Smith | ................... | H02K 21/24 310/208 |
| 10,186,922 B2 * | 1/2019 | Schuler | ................. | H02K 11/30 |
| 11,201,516 B2 * | 12/2021 | Schuler | ................... | H02K 3/26 |
| 11,283,319 B2 * | 3/2022 | Park | ....................... | H01F 27/22 |
| 2010/0148611 A1 | 6/2010 | Wang et al. | | |
| 2013/0342054 A1 | 12/2013 | Long et al. | | |
| 2014/0009022 A1 | 1/2014 | Kim | | |
| 2017/0012480 A1 | 1/2017 | Woolmer | | |
| 2020/0321815 A1 | 10/2020 | Klontz et al. | | |

OTHER PUBLICATIONS

International Search Report and Written Opinion dated Aug. 3, 2022, for International Application No. PCT/US2022/017606, 19 pages.

* cited by examiner

*Primary Examiner* — Dang D Le

(74) *Attorney, Agent, or Firm* — Frost Brown Todd LLP

(57) ABSTRACT

A stator configuration for a motor or generator has a stator core made of a thermally conductive material. The field coil of this configuration is secured to the stator core by a thermally conductive material. A field coil configuration has first and second layers of windings of an electrical conductor in which adjacent flat surfaces disposed generally parallel to the axis of magnetic flux of the coil are in direct contact with each other. The stator configuration and the field coil configuration may be an element of an electric motor or generator.

22 Claims, 7 Drawing Sheets

AXIAL FLUX PERMANENT MAGNET MOTOR/GENERATOR

TECHNICAL FIELD

The present disclosure relates generally to axial flux permanent magnet motors and generators. Specifically disclosed are a motor/generator comprising a stator and coil configuration which provides low loss/high efficiency and high thermal conductivity.

BACKGROUND

All motors and generators experience rotational losses during the conversion of power between electrical power and mechanical power. The losses are particularly problematic for high speed motors/generators which operate at high speeds, i.e., above 10,000 RPM, such as at 250,000 RPM. Magnetic losses, which include hysteresis losses and eddy current losses, account for a not insubstantial proportion of such rotational losses, increasing as rotational speed increases. The use of low hysteresis steel may reduce hysteresis loss at higher speeds, but requires more mass resulting in heavier motors. Heat buildup also present a problem with high speed, high torque motors/generators.

BRIEF DESCRIPTION OF THE DRAWINGS

The accompanying drawings together with specification, including the detailed description which follows, serve to explain the principles of the present innovation.

DETAILED DESCRIPTION

Figure 1:
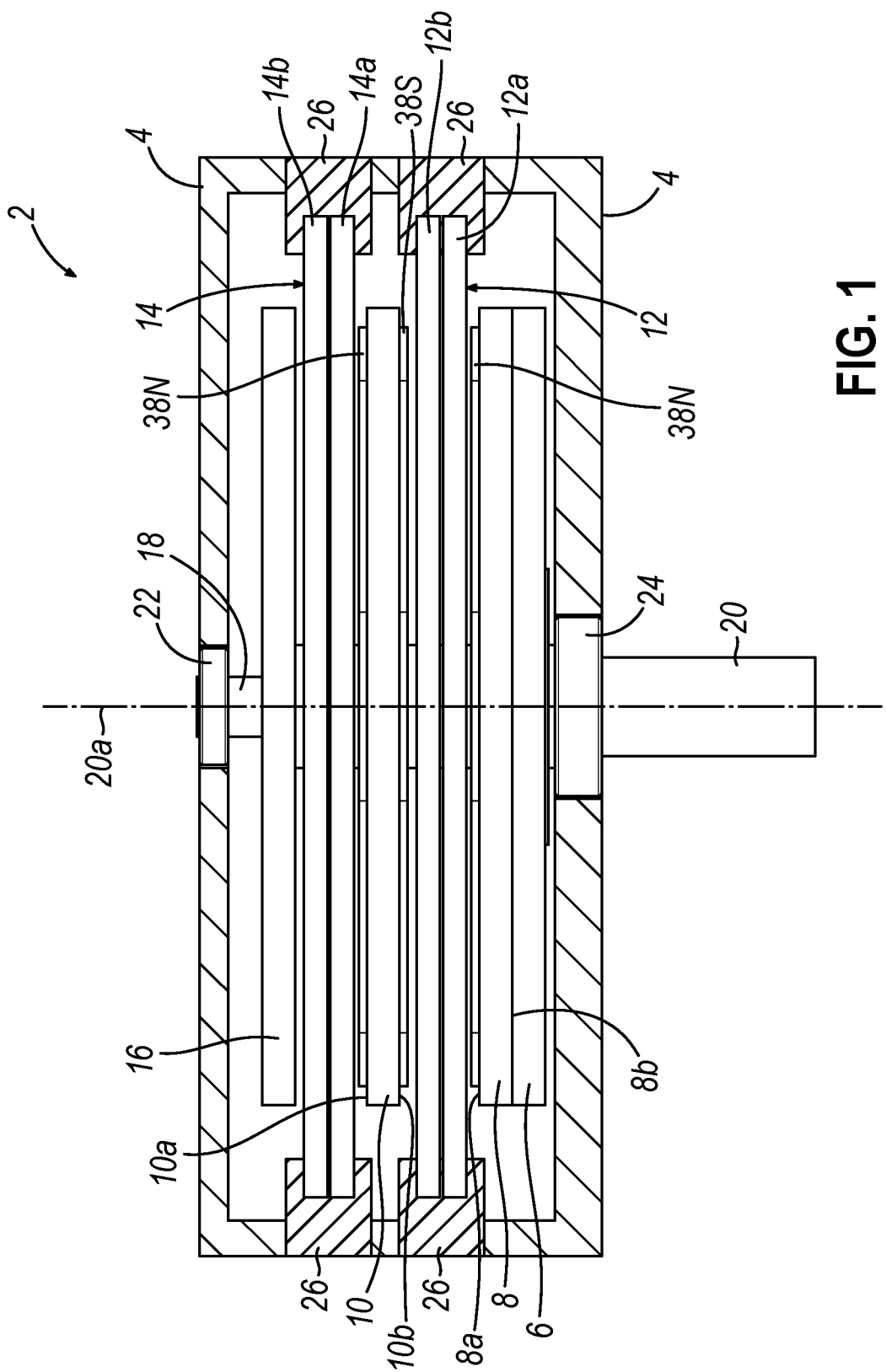
FIG. 1 is a side view illustration in partial cross-section showing the internal components of an electric motor/generator within a housing, constructed in accordance with the teachings of the present invention.

To the extent necessary, the disclosure as explicitly set forth herein supersedes any conflicting material incorporated herein by reference.

In the following description, like reference characters designate like or corresponding parts throughout the several views. Also, in the following description, it is to be understood that terms such as front, back, inside, outside, and the like are words of convenience and are not to be construed as limiting terms. Terminology used in this patent is not meant to be limiting insofar as devices described herein, or portions thereof, may be attached or utilized in other orientations. Referring in more detail to the drawings, one or more embodiments constructed according to the teachings of the present innovation are described.

FIG. 1 illustrates motor/generator, generally indicated at 2. Motor 2 is configured as an axial flux motor, wherein the gap between the rotor and stator is aligned parallel with the axis of rotation. In this configuration, the direction of the magnetic flux is parallel with the axis of rotation. As well known, with the appropriate controller, the configuration illustrated in FIG. 1 can be operated as a motor converting electrical energy into mechanical energy as well as a generator converting mechanical energy into electrical energy. For simplicity of explanation, the embodiment depicted in the figures will be referred to as a motor, it being understood that the depicted embodiment may also operate as and be referred to as a generator. Motor 2 comprises housing 4, front plate 6, rotors 8 and 10, stators 12 and 14, backing plate 16, shaft 18, shaft 20, rear bearing 22 and front bearing 24. Housing 4 may comprise multiple parts assembled together to form housing. Housing 4 may comprise structure of another apparatus within which the components of motor 2 are supported. It is noted that shaft 20 may function as an output shaft when the embodiment is operated as a motor and may function as an input shaft when the embodiment is operated as a generator. Consistent with referring to the embodiment as a motor, shaft 20 will be referred to as output shaft 20.

Bearings 22 and 24 are supported by housing 4, and may be secured thereto in any manner. Shaft 18 is rotatably supported by rear bearing 22 and output shaft 20 is rotatably supported by front bearing 24 to rotate about motor axis 20a. Output shaft 20 may be configured to couple or otherwise connect with a member external to motor 2 to transfer mechanical power. Although described with two numerals herein, shaft 18 and output shaft 20 may be comprise a single shaft and may even have a uniform diameter throughout its length. For simplicity, shaft 18 and output shaft 20 shall be referred to as a single shaft output shaft 20.

Front plate 6, rotors 8 and 10, and backing plate 16 are connected to output shaft 20 such that they rotate with output shaft 20 and transfer force therebetween: In the embodiment depicted, front plate 6, rotors 8 and 10 and backing plate 16 rotate together, with no relative rotation therebetween, and may be connected to output shaft 20 in any manner. For example, front plate 6, rotors 8 and 10 and backing plate 16 may have internal splines at their inner hubs which are shaped complementarily to and mate with external splines on output shaft 20. Output shaft 20 could have a keyway with the inner hubs of front plate 6, rotors 8 and 10 and backing plate 16 having complementarily shaped keyway slots.

Stators 12 and 14 are non-rotatably supported, such as by housing 4. In the embodiment shown, a plurality of standoffs 26 may be connected in any suitable fashion to stators 12 and 14 and to housing 4. Standoffs 26 may be connected to housing 4 in any suitable fashion.

Thus, as output shaft 20 rotates there is relative rotation between stators 12 and 14 on the one hand, and front plate 6, rotors 8 and 10 and backing plate 16 on the other hand.

FIG. 1 illustrates a plurality of rotors 8 and 10 alternating with stators 12 and 14, interposed between front plate 4 and backing plate 16. Motor 2 may comprise one or more stators and rotors.

Figure 2:
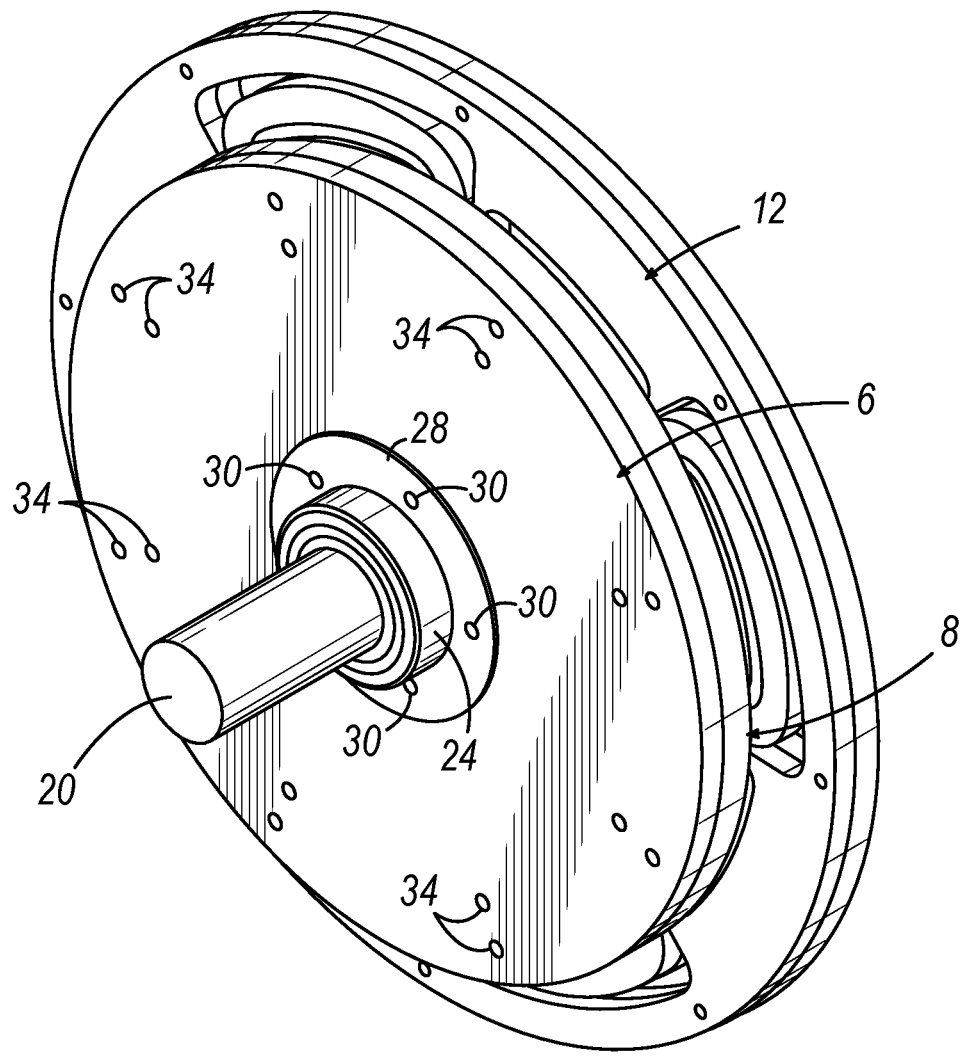
FIG. 2 is an isometric view of some components of FIG. 1.
Figure 3:
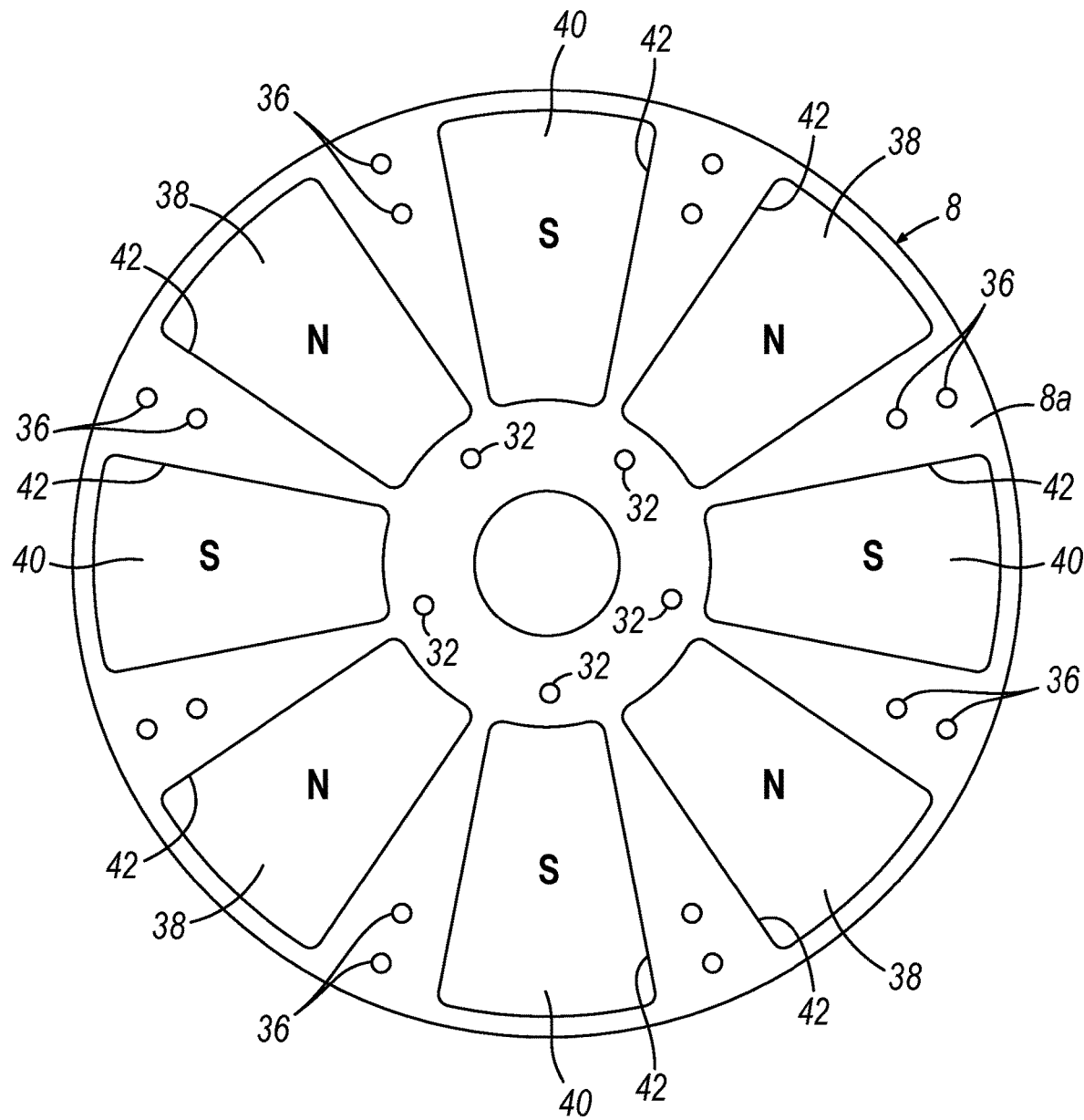
FIG. 3 is a plan view of a rotor of FIG. 1.

Referring also to FIG. 2, front plate 6, rotor 8, stator 12 and output shaft 20 are shown in perspective without housing 4 and the other components seen in FIG. 1. An alternate configuration for connecting front plate 6 and rotor 8 to shaft 20 can be seen. Plate 28 may be non-rotatably connected to shaft 20 and connected to plate 6 through a plurality of connection features 30. Rotor 8 may comprise a plurality connection features 32 (see FIG. 3) which connect rotor 8 to connection features 30. Front plate 6 may also comprise a plurality of connection features 34 which are configured and disposed to function complementarily with a plurality of mounting or connection features 36 of rotor 8 (see FIG. 3).

Rotor 8 comprises an alternating magnetic pole pattern. In the embodiment depicted in FIG. 3, a plurality of spaced apart radially extending magnets 38 and 40. Magnets 38 and 40 may be disposed in respective openings or pockets 42 and secured to rotor 8 using any suitable means, such as epoxy. The orientation of the pole of a magnet is opposite the orientation of the poles of its adjacent neighbors producing an alternating pole pattern. For example, in FIG. 3, magnets 38 are illustrated with their respective north poles extending out of the drawing parallel to motor axis 20*a*, while magnets 40 are illustrated with their respective south poles extending out of the drawing also parallel with motor axis 20*a*, creating an alternating pole pattern or array. Magnets 38 and 40 of each rotor 8 and 10, as well as of any additional rotors beyond the plurality of two rotors illustrated, are aligned with the corresponding magnets 38 and 40 of the other rotors: Thus, magnets 38 of rotor 8 are aligned with magnets 38 of rotor 10, with the north poles of magnets 38 of rotor 8 facing the south poles of magnets 38 of rotor 10. As illustrated in FIG. 1, south pole 38S of magnet 38 of rotor 10 is facing north pole 38N of magnet 38 of rotor 8. As also seen in FIG. 1, magnets 38 and 40 may be disposed flush to beyond surface 8*a* of rotor 8, and beyond surfaces 10*a* and 10*b* of rotor 10. In the embodiment depicted, magnets 38 and 40 do not extend beyond surface 8*b* of rotor 8, as is evident by direct contact between rotor 8 and plate 6.

Magnets 38 and 40 may be disposed as close as possible to each other so as to minimize the areas of rotor 8 that do not have large field densities, while maintaining sufficient structural strength of rotor 8 for its rotational operation. Any suitable number of poles may be present. Rotor 8 may be made of any material suitable for the alternating magnetic pole configuration, such as but not limited to, a weakly magnetic or non magnetic material, such as carbon fiber, stainless steel or aluminum.

In the embodiment depicted, backing plate 16 comprises a material with high magnetic permeability, such as steel or iron, as is necessary to complete the magnetic field circuit resulting from the alternating pole pattern of magnets 38 and 40. Since backing plate 16 rotates concomitantly with rotors 8 and 10, there is no variation in the magnetic flux in the backing plate 16, eliminating hysteresis loss.

Figure 4:
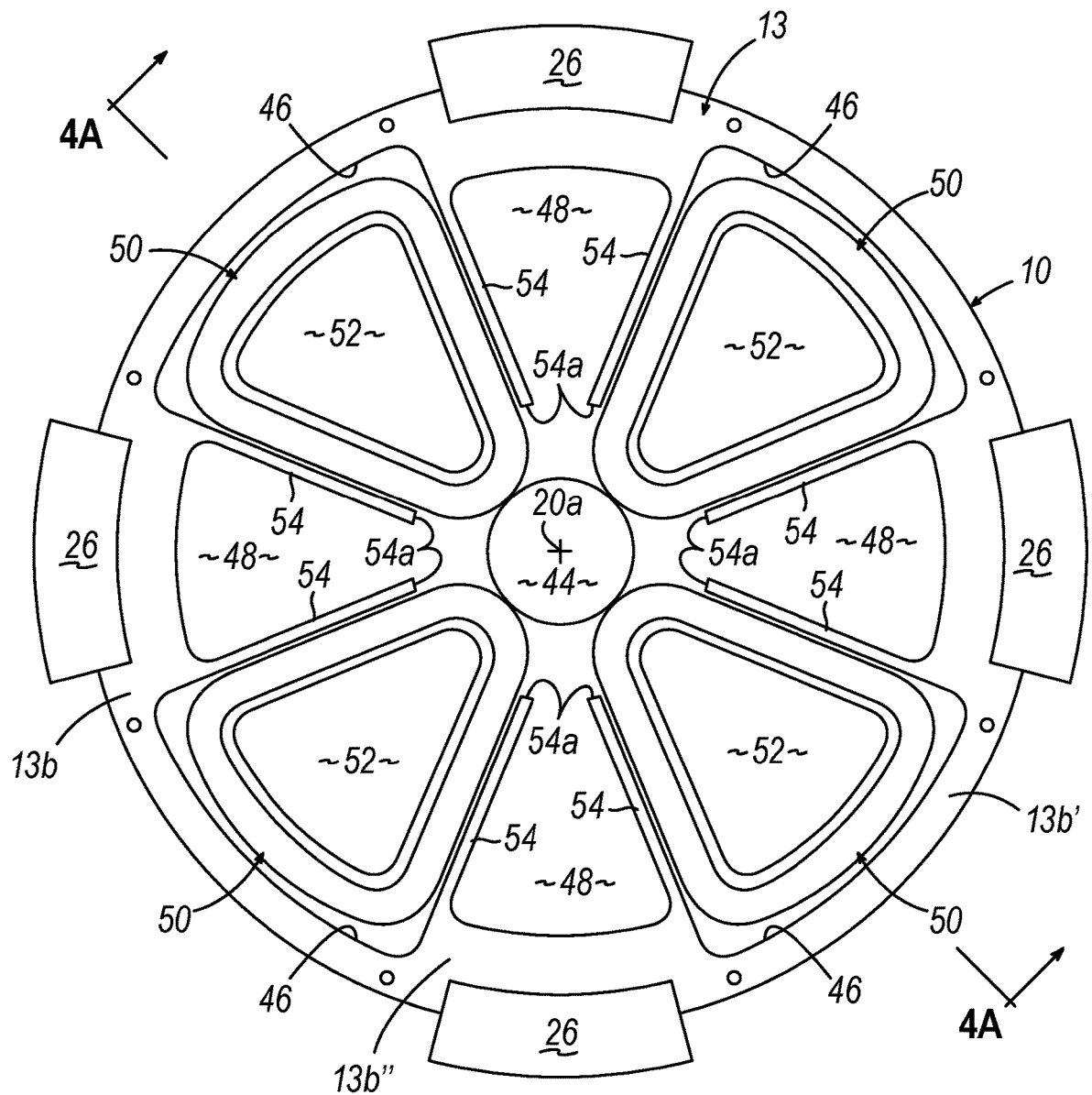
FIG. 4 is a plan view of a stator of FIG. 1.

Referring to FIG. 4, stator 12 is illustrated, which in the embodiment depicted is configured the same as stator 14. Additional stators may be used, interposed between rotors, and may be configured the same or similar to stator 12. Stators 12 and 14 are not connected to shaft 18 or output shaft 20, but are non-rotatably supported by any suitable structure, such as standoffs 26 thus supported by housing 2. Any suitable number and suitable configuration of standoffs 26 may be used, and they may be fastened to stator 12 in any suitable manner. Stator 12 includes centrally disposed opening 44 through which shaft 18 or output shaft 20 may be disposed. Stator 12 includes stator core 13 which comprises generally flat web portion 13*a*, through which opening 44 is formed (see FIG. 4*a*), and a generally annular wall 13*b* extending upright from web portion 13*a*. Stator core 13 includes a first plurality of circumferentially spaced of pockets 46, bounded in the embodiment depicted at the bottom by flat web portion 13*a*. Stator core 13 may comprise a plurality of walls 54 which define the radially extending sides of pockets 46. Stator core 13 may have a plurality of cavities or areas 48 defined by walls 54 which are devoid of material.

Wall 13*b* may be uniform in radial width, or may vary as seen in FIG. 4. For example, in the embodiment depicted, wall portions 13*b*' adjacent pockets 46 have a smaller radial width than wall portions 13*b*" adjacent cavities or voids 48.

Stator 12 comprises a plurality of field coils 50, one each disposed in a respective pocket 46. As is typical, the number of field coils 50 is half as many as the number of magnets 38 and 40. Field coils 50 may be secured in pockets 46 by any suitable means, such as by an epoxy 47*a* disposed between field coils 50 and the walls that define pocket 46. Epoxy 47*a* has a thermal conductivity of at least 2 W/mK.

In accordance with teachings of the present invention, in the embodiment depicted, stators 12 and 14 are configured to transfer heat from field coils 50, functioning as heat sinks and having high thermal conductivity to provide high heat transfer from field coils 50, to reduce heat buildup in the coils. In the embodiment depicted, stator core 13 is made of a highly heat conductive material, and the material used to secure field coils 50 in pockets 46 is also a high heat conductive material. Material having a thermal conductivity of at least 100 W/mK may be used. For example, stator core 13 may be made of sintered aluminum nitride which provides a thermal conductivity of about 285 W/mK, of cubic boron-nitride, which provides a thermal conductivity of about 600 W/mK or of diamond aluminum nitride, which provides a thermal conductivity of about 740 W/mK. For most applications, sintered aluminum nitride cost effectively provides adequate thermal conductivity. For high power densities, cubic boron-nitride provides additional thermal conductivity. For ultra high power density motors with high torque, diamond centric cubic boron-nitride provides yet additional thermal conductivity properties.

Figure 4A:
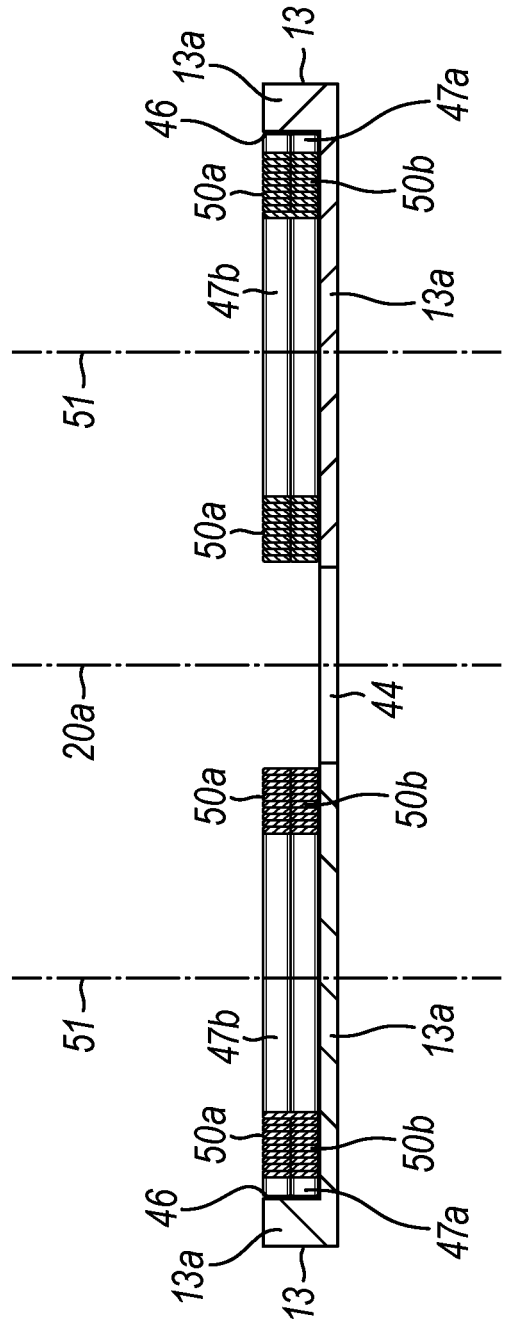
FIG. 4A is a cross-section taken along line 4A-4A of FIG. 4.

Referring to FIG. 4A, field coils 50 are open core coils, with cores 52 not having ferromagnetic material therein. Cores 52 of field coils 50 are may be filled with a heat conductive material, such as a thermally conductive epoxy 47*b* to facilitate heat transfer from field coils 50. The higher the thermal conductivity of thermally conductive epoxy 47*b* the better. For example, thermally conductive epoxy 47*b* may have a thermal conductivity of at least 100 W/mK. Thermally conductive epoxy 47*b* also functions to hold field coils 50 secure to web portion 13*a*. Epoxy 47*a* also facilitates heat transfer from field coils 50 to the walls of pockets 46, and thus may comprise a thermally conductive epoxy, such as the same epoxy as thermally conductive epoxy 47*b*.

Additionally, heat may be conducted away from stators 12 and 14 to housing 4 through standoffs 26 connected to stator core 13. Standoffs 26 also hold stators 12 and 14 in place. Housing 4 may be water cooled.

Further, in accordance with the teachings of the present invention, stators 12 and 14 are configured to reduce or eliminate eddy currents. In one embodiment, stators 12 and 14 may comprise an electrically non-conductive material to prevent or maintain low eddy current losses, such as sintered aluminum nitride or cubic boron-nitride. If stators 12 and 14 are made of a material which has electrically conductive properties, then, for the embodiment depicted as illustrated in FIG. 4, the respective thin walls 54 which define pockets 46 and cavities 48 are not connected to each other at their respective distal ends 54*a*. The gaps between distal ends 54*a* prevent eddy currents flowing through thin walls 54 if an electrically conductive material is used. The respective gaps between the distal ends 54*a* of the pairs of walls 54 which define areas or cavities 48 may be filed with an electrically non-conductive material, such as aluminum nitride, to prevent any incidental closing of an electrical loop which could allow eddy currents to exist. The structural rigidity of the stators may be increased by filling the gap between distal ends 54*a*, allowing the structure to provide a higher torque.

Figure 5:
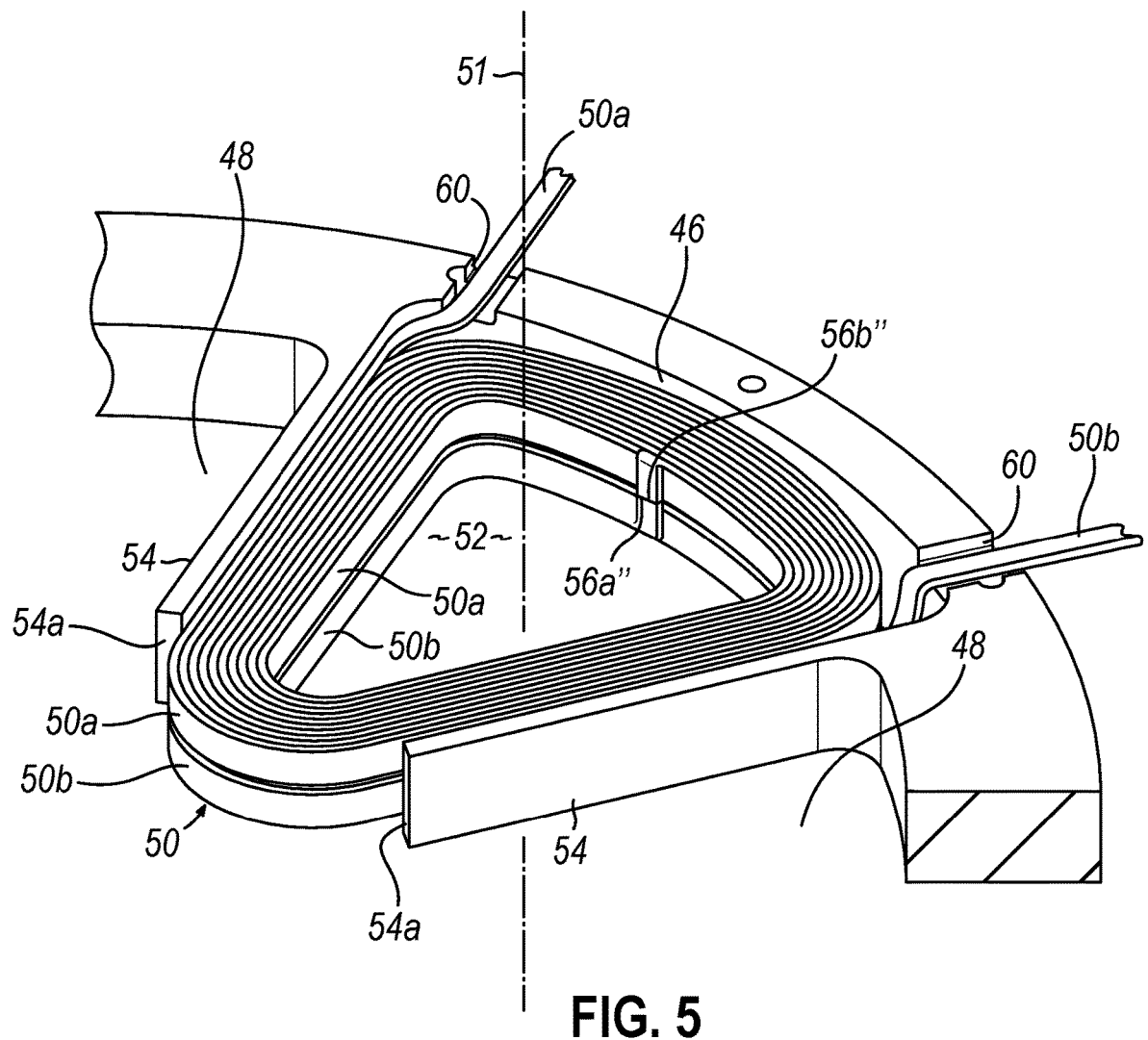
FIG. 5 is a fragmentary perspective view illustrating a field coil of the stator of FIG. 4.

Referring to FIG. 5, a respective field coil 50, of the plurality of field coils, is illustrated disposed in respective pocket 46. Any field coil with the direction of magnetic flux 51 with motor axis 20a of motor 2.

Figure 6:
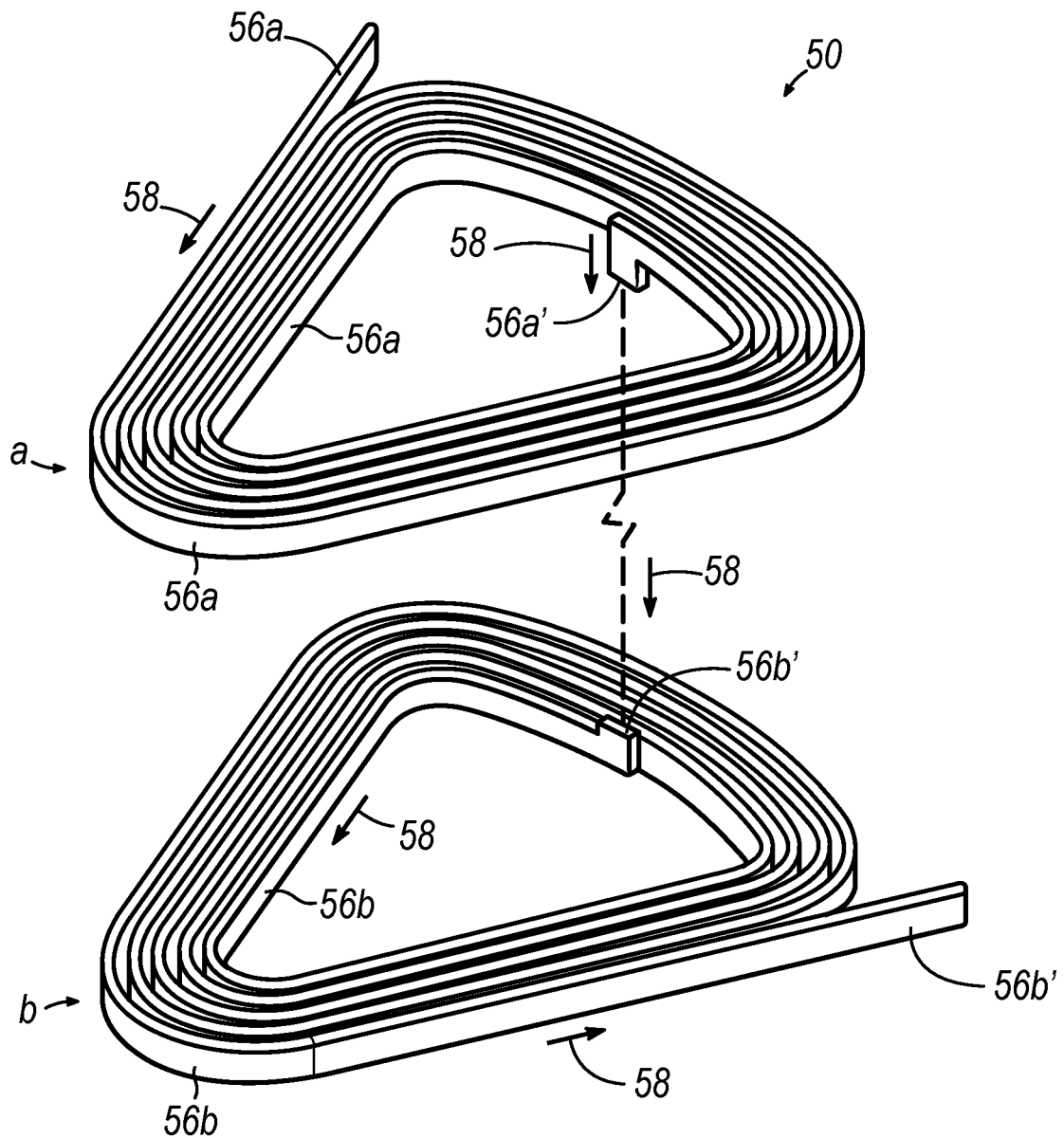
FIG. 6 is a diagrammatic exploded view of the exemplary winding of the field coil which is depicted in FIG. 5.

Referring also to FIGS. 4A and 6, in the embodiment depicted, field coils 50 are configured to effectively conduct heat generated by the coil from winding to winding. Field coil 50 comprises a plurality of individual windings identified as 50a (upper layer a) and 50b (lower layer b), with each of the windings 50a, 50b comprising electrically insulated flat copper wire wound with the inner flat surface of each respective winding 50a of upper layer a and each respective winding 50b of lower layer b disposed adjacent to and in contact with the outer flat surface of the respective adjacent winding 50a, 50b within the respective layer a, b. The wire that forms windings 50a, 50b, has two oppositely facing flat surfaces which are disposed generally parallel to axis 20a. The thickness of each winding in a radial direction from the line of direction of flux 51 may be of any appropriate dimension, it being recognized that the "radial" thickness and the axial height of the wire comprising field coils 50 establishes the equivalent gauge size of the flat windings 50a, 50b. By way of example, the size of the wire comprising field coils 50 may have an equivalent 16 gauge.

The direct flat surface to flat surface configuration provides a very high copper fill factor, also referred to as a high winding packing factor. The higher the copper fill factor the higher the magnetic field (for a given current flow) of the coil 50. By this flat side to flat side winding configuration, field coil 50 is configured to provide high heat transfer as a result of the larger contact surface area between adjacent windings. The high heat transfer between windings 50a, 50b of field coils 50 provides better heat transfer to stator cores 13, which is aided by the use of high thermal conductivity material, such as epoxy 47a and 47b. Although the present invention is not so limited, the flat surface to flat surface coil winding configuration as depicted also has a small surface area in the magnetic plane (perpendicular to direction of flux 51) which limits eddy current losses at high speed operation. Flat surface windings 50a, 50b have more surface area than round coils, providing more surface to carry current at higher frequencies associated with high RPM, which allows the use of less copper in field coil windings 50a, 50b, reducing cost and weight for an equivalent current.

Referring to FIG. 5, leads 50a' (top layer a) and 50b' (bottom layer b) of field coil 50 may be disposed in respective recesses 60. Each stator core 13 may comprise at least one coil layer or may each comprise a plurality of stacked coil layers. Each stator may comprise a plurality of stator cores, such as indicated at 12a and 12b, and 14a and 14b, as seen in FIGS. 1 and 2. The plurality of stator cores may be held together by any suitable fastening means, such as with glass fiber or other composite material and filled with epoxy resin.

Referring to FIG. 6, there is diagrammatically illustrated an exploded view of the depicted exemplary winding of field coil 50, with windings 56a configured in accordance with an aspect of the teachings of the invention. FIG. 6 illustrates top layer a of windings 56 of field coil 50, and bottom layer b of windings 56 of field coil 50. Top layer a comprises windings 56a wound spiraling inwardly from the outside and bottom layer b comprises windings 56b wound spiraling outwardly from the inside. The flat wire makes the transition between layers a and b at 56a" and 56b", as a continuous conductor. Thus, there is no conductor crossover in the center of field coil 50 and the direction of current, represented by arrows 58 and the resulting direction of the magnetic field is the same for both top layer a and bottom layer b.

FIG. 6 illustrates a gap between adjacent windings 56a of layer a and between adjacent windings 56b of layer b. The gap is depicted only for illustrative purposes for clarity in illustrating windings 56a, 56b: As described above, the inner flat surface of each respective winding 50a, 50b is disposed adjacent to and in contact with the outer flat surface of the respective adjacent winding 50a, 50b.

Windings 56a and 56b may be of unitary construction. FIGS. 5 and 6 illustrate an exemplary way which field coils 50 may be constructed of two discrete windings 56a and 56b and joined together by connecting end 56a" of winding 56a of upper layer a with end 56b" of winding 56b of lower layer b. Layer a may be wound separate from layer b, with end 56a" formed at the end of windings 56a of layer a on the inside (core side) of upper layer a. Similarly, inner layer b may be wound separate from layer a, with end 56b" formed at the end of windings 56b of layer b on the inside (core side), aligned with end 56a". Layer a may be disposed adjacent layer b, and ends 56a" and 56b" electrically joined.

Example 1

A stator comprising: a stator core defining a planar volume, the stator core comprising a thermally conductive material; a plurality of field coils secured to the stator core, the plurality of field coils being circumferentially spaced from each other, each respective field coil of the plurality of field coils comprising an open core; and each respective field coil of the plurality of field coils secured to the stator core by a thermally conductive adhesive material.

Example 2

The stator of example 1, wherein the stator core defines a plurality of circumferentially spaced respective pockets in which a respective field coil of the plurality of field coils is disposed.

Example 3

The stator of example 2, wherein each pocket of the plurality of pockets is defined by a respective pair of a plurality of radially extending walls.

Example 4

The stator of example 3, wherein each wall of the radially extending walls comprises a radially inner distal end, such that the stator core comprises respective gaps between circumferentially adjacent distal ends.

Example 5

The stator of example 1, wherein the stator core comprises: a generally flat web portion having an outer periphery; an annular wall extending perpendicularly from the outer periphery; a plurality of walls extending perpendicularly from the web portion and radially inward from the annular wall; and a plurality of pockets, each pocket of the plurality of pockets defined by a respective pair of the plurality of walls, each respective field coil disposed in a respective pocket.

Example 6

The stator of example 1, wherein each respective field core further comprises: an axis of magnetic flux; a continuous electrical conductor configured as a plurality of axially adjacent layers, each layer comprising a respective plurality of spirally disposed adjacent windings, the electrical conductor comprising a first coil lead and a second coil lead; a first layer of the plurality of axially adjacent layers comprising an outer layer lead and an inner layer lead wherein the windings are wound spirally inwardly from the outer layer lead to the inner layer lead, and wherein that portion of the electrical conductor which comprises the windings of the first layer comprises oppositely facing first and second flat surfaces disposed generally parallel to the axis of magnetic flux and wherein the first surface of each winding of a plurality of the windings of the first layer is disposed adjacent to and in direct contact with the second surface of an adjacent winding of the plurality of the windings of the first layer; and a second layer of the plurality of axially adjacent layers comprising an outer layer lead and an inner layer lead wherein the windings are wound spirally inwardly from the outer layer lead to the inner layer lead, and wherein that portion of the electrical conductor which comprises the windings of the second layer comprises oppositely facing first and second flat surfaces disposed generally parallel to the axis of magnetic flux and wherein the first surface of each winding of a plurality of the windings of the second layer is disposed adjacent to and in direct contact with the second surface of an adjacent winding of the plurality of the windings of the second layer.

Example 7

An electrical field coil for a motor or generator, the electric field coil comprising: an axis of magnetic flux; a continuous electrical conductor configured as a plurality of axially adjacent layers, each layer comprising a respective plurality of spirally disposed adjacent windings, the electrical conductor comprising a first coil lead and a second coil lead; a first layer of the plurality of axially adjacent layers comprising an outer layer lead and an inner layer lead wherein the windings are wound spirally inwardly from the outer layer lead to the inner layer lead, and wherein that portion of the electrical conductor which comprises the windings of the first layer comprises oppositely facing first and second flat surfaces disposed generally parallel to the axis of magnetic flux and wherein the first surface of each winding of a plurality of the windings of the first layer is disposed adjacent to and in direct contact with the second surface of an adjacent winding of the plurality of the windings of the first layer; and a second layer of the plurality of axially adjacent layers comprising an outer layer lead and an inner layer lead wherein the windings are wound spirally inwardly from the outer layer lead to the inner layer lead, and wherein that portion of the electrical conductor which comprises the windings of the second layer comprises oppositely facing first and second flat surfaces disposed generally parallel to the axis of magnetic flux and wherein the first surface of each winding of a plurality of the windings of the second layer is disposed adjacent to and in direct contact with the second surface of an adjacent winding of the plurality of the windings of the second layer.

Example 8

The electrical field coil of example 7, wherein the first layer is disposed adjacent the second layer aligned with the axis of magnetic flux.

Example 9

The electrical field coil of example 8, wherein the electrical conductor is of unitary construction between each of the plurality of layers.

Example 10

The electrical field coil of example 9, wherein the respective inner layer leads of the first and second layers are unitarily continuous.

Example 11

The electrical field coil of example 8, wherein the electrical conductor comprises respective discrete segments within each layer which are electrically joined to each other.

Example 12

The electrical field coil of example 7, wherein the outer layer lead of the first layer comprises the first coil lead.

Example 13

An electric motor or generator comprising: a housing; a shaft rotatably supported by the housing, the shaft defining an axis of rotation of the motor; at least one rotor connected to the shaft with no relative rotation therebetween, the rotor comprising a plurality of spaced apart radially extending magnets oriented to create an alternating pole pattern, the poles of the magnets being oriented generally parallel to the axis of rotation; and a stator which is non-rotatable, the stator comprising: a stator core defining a planar volume, the stator core comprising a thermally conductive material; a plurality of field coils secured to the stator core, the plurality of field coils being circumferentially spaced from each other, each respective field coil of the plurality of field coils comprising an open core; and each respective field coil of the plurality of field coils secured to the stator core by a thermally conductive adhesive material.

Example 14

The motor or generator of example 13, wherein the stator core defines a plurality of circumferentially spaced respective pockets in which a respective field coil of the plurality of field coils is disposed.

Example 15

The motor or generator of example 14, wherein each pocket of the plurality of pockets is defined by a respective pair of a plurality of radially extending walls.

Example 16

The motor or generator of example 15, wherein each wall of the radially extending walls comprises a radially inner distal end, such that the stator core comprises respective gaps between circumferentially adjacent distal ends.

Example 17

The motor or generator of example 13, wherein each respective field core further comprises: an axis of magnetic flux disposed generally parallel to the axis of rotation; a continuous electrical conductor configured as a plurality of axially adjacent layers, each layer comprising a respective plurality of spirally disposed adjacent windings, the electrical conductor comprising a first coil lead and a second coil lead; a first layer of the plurality of axially adjacent layers comprising an outer layer lead and an inner layer lead wherein the windings are wound spirally inwardly from the outer layer lead to the inner layer lead, and wherein that portion of the electrical conductor which comprises the windings of the first layer comprises oppositely facing first and second flat surfaces disposed generally parallel to the axis of magnetic flux and wherein the first surface of each winding of a plurality of the windings of the first layer is disposed adjacent to and in direct contact with the second surface of an adjacent winding of the plurality of the windings of the first layer; and a second layer of the plurality of axially adjacent layers comprising an outer layer lead and an inner layer lead wherein the windings are wound spirally inwardly from the outer layer lead to the inner layer lead, and wherein that portion of the electrical conductor which comprises the windings of the second layer comprises oppositely facing first and second flat surfaces disposed generally parallel to the axis of magnetic flux and wherein the first surface of each winding of a plurality of the windings of the second layer is disposed adjacent to and in direct contact with the second surface of an adjacent winding of the plurality of the windings of the second layer.

Example 18

The electrical field coil of example 17, wherein the first layer is disposed adjacent the second layer aligned with the axis of magnetic flux.

Example 19

The electrical field coil of example 18, wherein the electrical conductor is of unitary construction between each of the plurality of layers.

Example 20

The electrical field coil of example 19, wherein the respective inner layer leads of the first and second layers are unitarily continuous.

Example 21

The electrical field coil of example 18, wherein the electrical conductor comprises respective discrete segments within each layer which are electrically joined to each other.

Example 22

The electrical field coil of example 17, wherein the outer layer lead of the first layer comprises the first coil lead.

Example 23

A method of mounting a plurality of electrical coils to a thermally conductive substrate comprising: providing a thermally conductive substrate; providing a plurality of circumferentially spaced walls extending perpendicularly from the substrate and extending radially from a central axis; disposing each respective electrical coil of the plurality of electrical coils adjacent the substrate between respective pairs of walls, each respective electrical coil having an air core; securing each respective electrical coil to the substrate with a thermally conductive adhesive material disposed in the air core of the respective electrical coil, the thermally conductive adhesive material being in contact with the substrate and the respective electrical coil.

The foregoing description has been presented for purposes of illustration and description of this invention. It is not intended to be exhaustive or to limit the invention to the precise form disclosed. Examples given, such as involving the use of phrases such as "for example", "by way of example" and "an example", are to be interpreted as non-limiting. Obvious modifications or variations are possible in light of the above teachings. The embodiment was chosen and described in order to best illustrate the principles of the invention and their practical application to thereby enable one of ordinary skill in the art to utilize the invention in various embodiments and forms, and with various modifications as are suited to the particular use contemplated. Although only a limited number of embodiments is explained in detail, it is to be understood that the invention is not limited in its scope to the details of construction and arrangement of components set forth in the preceding description or illustrated in the drawings. The innovation is capable of being practiced or carried out in various ways and in various forms and other embodiments. Also specific terminology was used for the sake of clarity. It is to be understood that each specific term includes all technical equivalents which operate in a similar manner to accomplish a similar purpose. It is intended that the scope of the invention be defined by the claims submitted herewith.

The invention claimed is:

1. A stator comprising:
   a. a stator core defining a planar volume, the stator core comprising a thermally conductive material; and
   b. a plurality of field coils secured to the stator core, the plurality of field coils being circumferentially spaced from each other, each respective field coil of the plurality of field coils comprising:
      i. an axis of magnetic flux;
      ii. a continuous electrical conductor configured as a plurality of axially adjacent layers, each layer comprising a respective plurality of spirally disposed adjacent windings, the electrical conductor comprising a first coil lead and a second coil lead;
      iii. a first layer of the plurality of axially adjacent layers comprising an outer layer lead and an inner layer lead wherein the windings are wound spirally inwardly from the outer layer lead to the inner layer lead, and wherein that portion of the electrical conductor which comprises the windings of the first layer comprises oppositely facing first and second flat surfaces disposed generally parallel to the axis of magnetic flux and wherein the first surface of each winding of a plurality of the windings of the first layer is disposed adjacent to and in direct contact with the second surface of an adjacent winding of the plurality of the windings of the first layer; and
      iv. a second layer of the plurality of axially adjacent layers comprising an outer layer lead and an inner layer lead wherein the windings are wound spirally inwardly from the outer layer lead to the inner layer lead, and wherein that portion of the electrical conductor which comprises the windings of the second layer comprises oppositely facing first and second flat surfaces disposed generally parallel to the axis of magnetic flux and wherein the first surface of each winding of a plurality of the windings of the second layer is disposed adjacent to and in direct contact with the second surface of an adjacent winding of the plurality of the windings of the second layer.

2. The stator of claim 1, wherein the stator core defines a plurality of circumferentially spaced respective pockets in which a respective field coil of the plurality of field coils is disposed.

3. The stator of claim 2, wherein each pocket of the plurality of pockets is defined by a respective pair of a plurality of radially extending walls.

4. The stator of claim 3, wherein each wall of the radially extending walls comprises a radially inner distal end, such that the stator core comprises respective gaps between circumferentially adjacent distal ends.

5. The stator of claim 1, wherein the stator core comprises
   a. a generally flat web portion having an outer periphery;
   b. an annular wall extending perpendicularly from the outer periphery;
   c. a plurality of walls extending perpendicularly from the web portion and radially inward from the annular wall; and
   d. a plurality of pockets, each pocket of the plurality of pockets defined by a respective pair of the plurality of walls, each respective field coil disposed in a respective pocket.

6. The stator of claim 1, wherein each respective field coil of the plurality of field coils is secured to the stator core by a thermally conductive adhesive material.

7. An electrical field coil for a motor or generator, the electric field coil comprising:
   a. an axis of magnetic flux;
   b. a continuous electrical conductor configured as a plurality of axially adjacent layers, each layer comprising a respective plurality of spirally disposed adjacent windings, the electrical conductor comprising a first coil lead and a second coil lead;
   c. a first layer of the plurality of axially adjacent layers comprising an outer layer lead and an inner layer lead wherein the windings are wound spirally inwardly from the outer layer lead to the inner layer lead, and wherein that portion of the electrical conductor which comprises the windings of the first layer comprises oppositely facing first and second flat surfaces disposed generally parallel to the axis of magnetic flux and wherein the first surface of each winding of a plurality of the windings of the first layer is disposed adjacent to and in direct contact with the second surface of an adjacent winding of the plurality of the windings of the first layer; and
   d. a second layer of the plurality of axially adjacent layers comprising an outer layer lead and an inner layer lead wherein the windings are wound spirally inwardly from the outer layer lead to the inner layer lead, and wherein that portion of the electrical conductor which comprises the windings of the second layer comprises oppositely facing first and second flat surfaces disposed generally parallel to the axis of magnetic flux and wherein the first surface of each winding of a plurality of the windings of the second layer is disposed adjacent to and in direct contact with the second surface of an adjacent winding of the plurality of the windings of the second layer.

8. The electrical field coil of claim 7, wherein the first layer is disposed adjacent the second layer aligned with the axis of magnetic flux.

9. The electrical field coil of claim 8, wherein the electrical conductor is of unitary construction between each of the plurality of layers.

10. The electrical field coil of claim 9, wherein the respective inner layer leads of the first and second layers are unitarily continuous.

11. The electrical field coil of claim 8, wherein the electrical conductor comprises respective discrete segments within each layer which are electrically joined to each other.

12. The electrical field coil of claim 7, wherein the outer layer lead of the first layer comprises the first coil lead.

13. An electric motor or generator comprising:
   a. a housing;
   b. a shaft rotatably supported by the housing, the shaft defining an axis of rotation of the motor;
   c. at least one rotor connected to the shaft with no relative rotation therebetween, the rotor comprising a plurality of spaced apart radially extending magnets oriented to create an alternating pole pattern, the poles of the magnets being oriented generally parallel to the axis of rotation; and
   d. a stator which is non-rotatable, the stator comprising:
      i. a stator core defining a planar volume, the stator core comprising a thermally conductive material; and
      ii. a plurality of field coils secured to the stator core, the plurality of field coils being circumferentially spaced from each other, each respective field coil of the plurality of field coils comprising:
         (a) an axis of magnetic flux;
         (b) a continuous electrical conductor configured as a plurality of axially adjacent layers, each layer comprising a respective plurality of spirally disposed adjacent windings, the electrical conductor comprising a first coil lead and a second coil lead;
         (c) a first layer of the plurality of axially adjacent layers comprising an outer layer lead and an inner layer lead wherein the windings are wound spirally inwardly from the outer layer lead to the inner layer lead, and wherein that portion of the electrical conductor which comprises the windings of the first layer comprises oppositely facing first and second flat surfaces disposed generally parallel to the axis of magnetic flux and wherein the first surface of each winding of a plurality of the windings of the first layer is disposed adjacent to and in direct contact with the second surface of an adjacent winding of the plurality of the windings of the first layer; and
         (d) a second layer of the plurality of axially adjacent layers comprising an outer layer lead and an inner layer lead wherein the windings are wound spirally inwardly from the outer layer lead to the inner layer lead, and wherein that portion of the electrical conductor which comprises the windings of the second layer comprises oppositely facing first and second flat surfaces disposed generally parallel to the axis of magnetic flux and wherein the first surface of each winding of a plurality of the windings of the second layer is disposed adjacent to and in direct contact with the second surface of an adjacent winding of the plurality of the windings of the second layer.

14. The electric motor or generator of claim 13, wherein the stator core defines a plurality of circumferentially spaced respective pockets in which a respective field coil of the plurality of field coils is disposed.

15. The electric motor or generator of claim 14, wherein each pocket of the plurality of pockets is defined by a respective pair of a plurality of radially extending walls.

16. The electric motor or generator of claim 15, wherein each wall of the radially extending walls comprises a radially inner distal end, such that the stator core comprises respective gaps between circumferentially adjacent distal ends.

17. The motor or generator of claim 13, wherein the at least one rotor comprises a plurality of spaced apart radially extending magnets oriented to create the alternating magnetic pole pattern.

18. The electric motor or generator of claim 13, wherein the first layer is disposed adjacent the second layer aligned with the axis of magnetic flux.

19. The electric motor or generator of claim 18, wherein the electrical conductor is of unitary construction between each of the plurality of layers.

20. The electric motor or generator of claim 19, wherein the respective inner layer leads of the first and second layers are unitarily continuous.

21. The electric motor or generator of claim 18, wherein the electrical conductor comprises respective discrete segments within each layer which are electrically joined to each other.

22. The electric motor or generator of claim 13, wherein the outer layer lead of the first layer comprises the first coil lead.

* * * * *